US011940975B2

(12) United States Patent
Li et al.

(10) Patent No.: US 11,940,975 B2
(45) Date of Patent: Mar. 26, 2024

(54) DATABASE DISTRIBUTION TO AVOID CONTENTION

(71) Applicant: International Business Machines Corporation, Armonk, NY (US)

(72) Inventors: Shuo Li, Beijing (CN); Peng Hui Jiang, Beijing (CN); Xiaobo Wang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 17/035,284

(22) Filed: Sep. 28, 2020

(65) Prior Publication Data

US 2022/0100727 A1 Mar. 31, 2022

(51) Int. Cl.
*G06F 16/23* (2019.01)
*G06F 16/25* (2019.01)
*G06F 16/27* (2019.01)

(52) U.S. Cl.
CPC ...... *G06F 16/2343* (2019.01); *G06F 16/2358* (2019.01); *G06F 16/256* (2019.01); *G06F 16/27* (2019.01); *G06F 16/278* (2019.01)

(58) Field of Classification Search
CPC ............... G06F 16/2343; G06F 16/256; G06F 16/278; G06F 16/2358; G06F 16/27
See application file for complete search history.

(56) References Cited

U.S. PATENT DOCUMENTS

| | | | |
|---|---|---|---|
| 9,122,741 B1 | 9/2015 | McAlister | |
| 9,355,134 B1 | 5/2016 | Wang | |
| 2010/0223243 A1 | 9/2010 | Huras | |
| 2016/0378828 A1* | 12/2016 | Hopcroft | G06F 16/2237 707/718 |
| 2018/0039710 A1* | 2/2018 | Chen | G06F 16/9024 |
| 2018/0314750 A1* | 11/2018 | Merriman | H04L 67/1097 |
| 2018/0357019 A1* | 12/2018 | Karr | G06F 11/2005 |
| 2019/0179613 A1* | 6/2019 | Stamos | G06F 16/278 |
| 2019/0179943 A1* | 6/2019 | Yang | G06F 16/24554 |

OTHER PUBLICATIONS

Anonymous et al., "Resharding", JBossDeveloper, Jun. 18, 2020, 2 Pages.
Drake, Mark, "Understanding Database Sharding", DigitalOcean, Feb. 7, 2019, 11 Pages.

(Continued)

*Primary Examiner* — Kris E Mackes
*Assistant Examiner* — Lin Lin M Htay
(74) *Attorney, Agent, or Firm* — Gavin Giraud

(57) ABSTRACT

A computer-implemented method that includes receiving an ingestion request to ingest data to a database comprising physical shards and detecting that the ingestion request is directed to a first hotspot shard. The first hotspot shard has a contention level over a threshold value. The method also detects context characteristics within the data and generates a first virtual shard based on a first virtual shard key selected from the detected context characteristics. The first virtual shard virtually duplicates at least a portion of the first hotspot shard. The method also includes ingesting the data to the first virtual shard.

20 Claims, 6 Drawing Sheets

(56) References Cited

OTHER PUBLICATIONS

Scherzinger et al., "AutoShard—Declaratively Managing Hot Spot Data Objects in NoSQL Data Stores", Seventeenth International Workshop on the Web and Databases (WebDB 2014), Jun. 22, 2014, Snowbird, UT, USA, 6 Pages.

Zamanian et al., "Chiller: Contention-centric Transaction Execution and Data Partitioning for Modern Networks", Research 6: Transaction Processing and Query Optimization, SIGMOD International Conference on Management of Data (SIGMOD '20), Jun. 14-19, 2020, Portland, OR, USA, ACM, New York, NY, USA, 16 pages.

Zhang, Leona, "Redis Hotspot Key Discovery and Common Solutions", DZone Database, Feb. 20, 2019, 9 Pages.

\* cited by examiner

DATABASE DISTRIBUTION TO AVOID CONTENTION

BACKGROUND

The present invention relates generally to the field of computer storage management, and more particularly to managing a database (e.g., relational database management system "RDMS", NoSQL) that uses shards.

Database systems with large data sets or high throughput applications can overload a single server. For example, high query rates can exhaust the CPU capacity of the server and working set sizes larger than the system's RAM stress the input/output capacity of disk drives. There are two methods for addressing system growth: vertical and horizontal scaling. Vertical scaling involves increasing the capacity of a single server, such as using a more powerful CPU, adding more RAM, or increasing the amount of storage space. Horizontal Scaling involves dividing the system data set and load over multiple servers, adding additional servers to increase capacity as required. For some database systems, horizontal scaling is supported as sharding.

Sharding enables a cluster of machines to act together to store information. Data within the system is distributed between shards based on a field or fields known as a shard key. Once a database system sets up the cluster of machines with the shard key, the sharding is set and cannot be changed. Therefore, in some cases, as data is written to the system one shard or another can grow beyond the specifications for the system but cannot undergo a split (e.g., when a shard is designated to represent a single shard key value). Since the shard cannot split, the system suffers a performance bottleneck, especially if the shard key value occurs with high frequency.

SUMMARY

According to one embodiment of the present invention, a computer-implemented method is provided. The method includes receiving an ingestion request to ingest data to a database comprising physical shards, detecting that the ingestion request is directed to a first hotspot shard, wherein the first hotspot shard comprises a contention level over a threshold value, detecting context characteristics within the data, generating a first virtual shard based on a first virtual shard key selected from the detected context characteristics. The first virtual shard virtually duplicates at least a portion of the first hotspot shard. The method may also include ingesting the data to the first virtual shard.

In certain embodiments, the first virtual shard key is generated from a context characteristic that is different from a primary context characteristic of the physical shards. In another embodiment, generating the first virtual shard includes tracking the context characteristics for potential virtual shard keys, evaluating a distribution of hotspot data for the potential virtual shard keys, and selecting the first virtual shard key based on the distribution of the hotspot data. The method may also include receiving a second ingestion request to ingest data to the database, detecting that the second ingestion request is directed to a second hotspot shard, generating a second virtual shard based on a second virtual shard key, and ingesting the data of the second ingestion request to the second virtual shard.

In certain embodiments, the method may include receiving a second ingestion request to ingest data to the database, detecting that the second ingestion request is directed to the first hotspot shard, generating a second virtual shard based on the first virtual shard key, and ingesting the data to the second virtual shard. The method may also include monitoring a contention level for the second virtual shard, detecting a low contention level for the second virtual shard, responsive to detecting the low contention level for the second virtual shard, determining that the second virtual shard is not necessary, and shrinking the second virtual shard.

In certain embodiments, the method may include receiving a second ingestion request to ingest data to the database, detecting that the second ingestion request is directed to the first hotspot shard, generating a second virtual shard based on a second virtual shard key, and ingesting the data to the second virtual shard. The method may also include receiving a third ingestion request to ingest data to the database, detecting that the third ingestion request is directed to the second virtual shard key, generating a third virtual shard based on a third virtual shard key, wherein the third virtual shard virtually duplicates at least a portion of the second virtual shard, and ingesting the data to the third virtual shard. Embodiments may also include maintaining parallel indexes of the physical shards and the first virtual shard.

According to another embodiment, a computer program product is provided. The computer program product includes one or more computer readable storage media, and program instructions collectively stored on the one or more computer readable storage media. The program instructions include receiving an ingestion request to ingest data to a database comprising physical shards, detecting that the ingestion request is directed to a first hotspot shard, wherein the first hotspot shard comprises a contention level over a threshold value, detecting context characteristics within the data, generating a first virtual shard based on a first virtual shard key selected from the detected context characteristics, wherein the first virtual shard virtually duplicates at least a portion of the first hotspot shard, and ingesting the data to the first virtual shard.

According to another embodiment, a computer system is provided. The computer system may include one or more computer processors, one or more computer readable storage media, and program instructions collectively stored on the one or more computer readable storage media for execution by at least one of the one or more computer processors. The program instructions may include receiving an ingestion request to ingest data to a database comprising physical shards, detecting that the ingestion request is directed to a first hotspot shard, wherein the first hotspot shard comprises a contention level over a threshold value, detecting context characteristics within the data, generating a first virtual shard based on a first virtual shard key selected from the detected context characteristics, wherein the first virtual shard virtually duplicates at least a portion of the first hotspot shard, and ingesting the data to the first virtual shard.

DETAILED DESCRIPTION

Embodiments of the present invention address databases that bottleneck due to contention that arises when physical shards become too large and/or too busy for the databases to efficiently manage. Each physical shard contains a portion of the sharded data, and access to the portion of data goes through the physical shard. In the embodiments presented here, however, a virtual shard is added as an additional point of data ingestion and query. The number of virtual shards may grow or shrink based on the activity (e.g., contention level) of the database. The virtual shard may be part of a multi-tier shard tree that organizes the ingestion and query of the sharded data.

Figure 1:
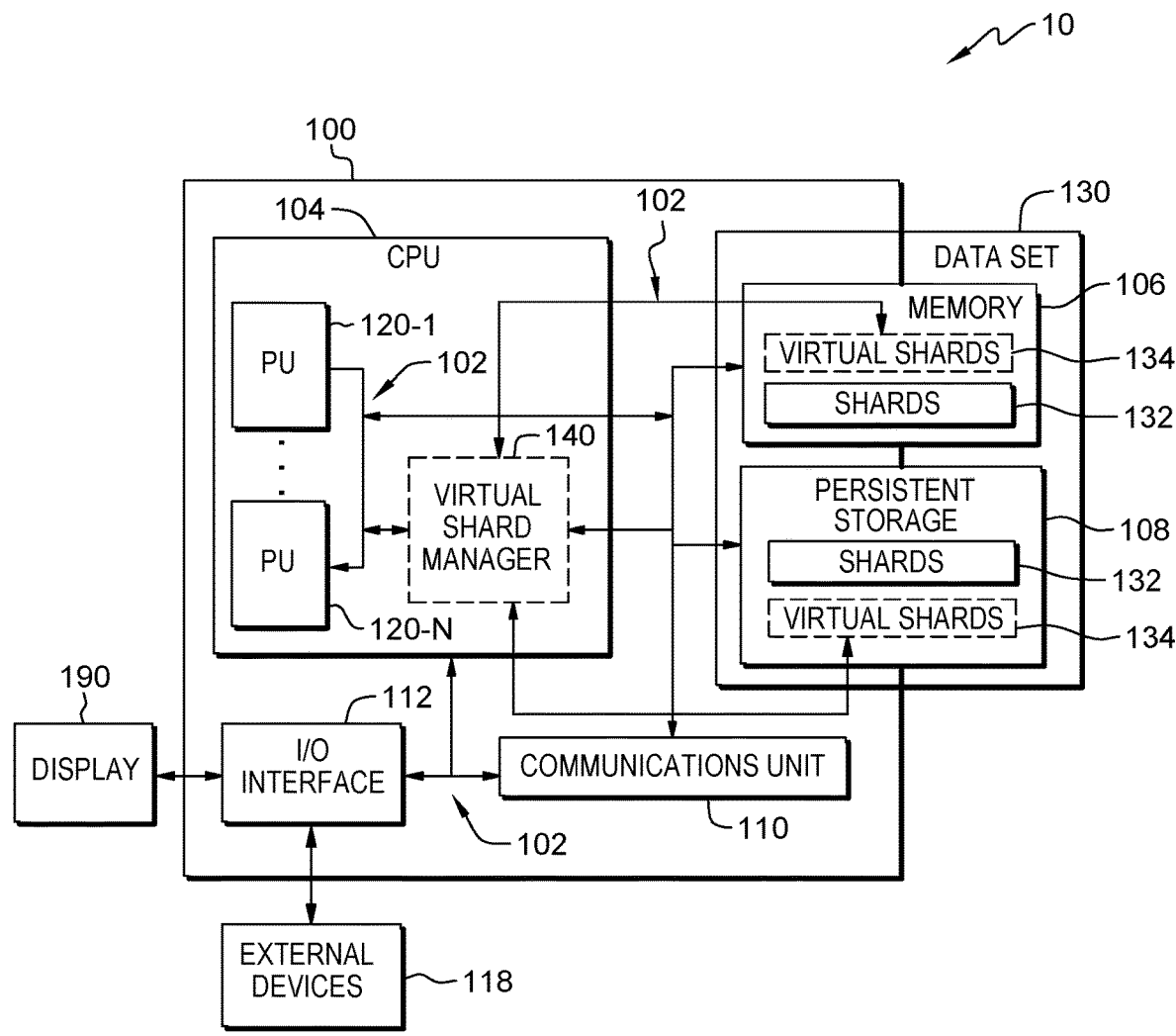
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment 10, and components of a computing device 100, in accordance with an illustrative embodiment of the present invention. It should be appreciated that FIG. 1 provides only an illustration of one implementation and does not imply any limitations regarding the environments in which different embodiments may be implemented. Many modifications to the depicted environment may be made. The computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, a smart phone, or any programmable electronic device.

The computing device 100 includes a bus 102, which provides communications between a CPU 104, a memory 106, a persistent storage 108, a communications unit 110, and an input/output (I/O) interface(s) 112. The bus 102 can be implemented with any architecture designed for passing data and/or control information between processors (such as microprocessors, communications and network processors, etc.), system memory, peripheral devices, and any other hardware components within a system. The bus 102 can be implemented with, for example, one or more buses or a crossbar switch. In general, the bus 102 is a communications fabric.

The CPU 104 may be a multi-core processor including PUs 120-1 through 120-N. A multi-core processor is a single computing component with two or more independent actual CPUs (e.g., PU 120-1 through PU 120-N), which are the processing units that read and execute program instructions. The CPU 104 includes PUs 120-1 through 120-N, and runs a virtual shard manager 140. The virtual shard manager 140 may be a software component executed by the CPU 104. PUs 120-1 through 120-N may each be an individual processor located on the CPU 104. In general, PUs 120-1 through 120-N share existing communication fabric, such as the bus 102, within the computing device 100 and the data processing environment 10. In some embodiments, multiple instances of the bus 102 may be used within the CPU 104, shared by a subset of the total number of PUs 120-1 through 120-N on the CPU 104. The PUs 120-1 through 120-N may each request data from one or more data sources, such as, for example, the memory 106, or the persistent storage 108. In embodiments of the present invention, there may be any number of PUs 120, as indicated by the annotation PU 120-1 through PU 120-N. In general, two or more PUs 120 may exist within the CPU 104. As used herein, PU 120 refers to any single PU of PUs 120-1 through 120-N.

The memory 106 and the persistent storage 108 are computer readable storage media that store a system data set 130 to be accessed and managed by the CPU 104. In this embodiment, the memory 106 includes random access memory (RAM). In general, the memory 106 can include any suitable volatile or non-volatile computer readable storage media. Programs may be stored in the persistent storage 108 and in the memory 106 for execution by the CPU 104. In an embodiment, the persistent storage 108 includes a magnetic hard disk drive. Alternatively, or in addition to a magnetic hard disk drive, the persistent storage 108 can include a solid state hard drive, a semiconductor storage device, read-only memory (ROM), erasable programmable read-only memory (EPROM), flash memory, or any other computer readable storage media that is capable of storing program instructions or digital information. The media used by the persistent storage 108 may also be removable. For example, a removable hard drive may be used for the persistent storage 108. Other examples include optical and magnetic disks, thumb drives, and smart cards that are inserted into a drive for transfer onto another computer readable storage medium that is also part of the persistent storage 108.

The memory 106 and the persistent storage 108 may include multiple physical devices located in the computing device 100 or located separately, in remote communication with the CPU 104. The memory 106 and the persistent storage 108 may divide the system data set 130 over multiple physical shards 132 (e.g., devices, servers, hard drives, internet and/or network locations), adding additional shards 132 to increase capacity and access as required. While the overall speed or capacity of a single shard 132 has a maximum speed of efficiency, the potential for providing better efficiency in data ingestion and query time goes up with each additional shard 132.

The shards 132 are divided based on a shard key, which is a field or fields in the documents stored in the data set 130. The choice of shard key affects the performance, efficiency, and scalability of the device 100. Specifically, since the shard key cannot be changed once the data set is initiated, some shards 132 may grow larger than other shards 132. In certain embodiments, the shards 132 may be split so that documents with some values for the shard key go to one shard 132 while documents with another shard key value go to a different shard 132. Some choices for shard key, however, prevent a shard 132 from being split. The most common example of a shard 132 being unable to split is when the shard 132 only includes a single shard key value (e.g., shard key is 'City' and the shard includes documents with a value of 'Beijing' or 'Pocatello' for the City value), all the documents that have this value for the shard key field will be ingested into this shard 132, no matter how many documents there are. Shards 132 that house too many documents are known as jumbo shards, which cause bottlenecks and slow down the device 100 for ingesting and indexing the data set 130.

To address these jumbo shards, the persistent storage 108 and the memory 106 may also include virtual shards 134 managed by a virtual shard manager 140. The virtual shard manager 140 operates to review ingestion requests from the CPU 104 to the shards 132 and monitors a contention level for the shards 132 and the data set 130. As described in detail below, the virtual shard manager 140 adds virtual shards 134 that may be accessed with reduced contention and indexed for faster application and transaction with the data set 130. The virtual shards 134 are stored as part of the data set 130, and the virtual shard manager 140 uses storage locations anywhere on the persistent storage 108 and/or the memory 106 to store the virtual shards 134. The virtual shard manager 140 generates the virtual shards 134 in a multi-tier tree structure that is not necessarily a reflection of the actual location of the virtual shards 134 on the persistent storage 108 and/or the memory 106.

The communications unit 110, in these examples, provides for communications with other data processing systems or devices. In these examples, the communications unit 110 includes one or more network interface cards. The communications unit 110 may provide communications using either or both physical and wireless communications links. Programs may be downloaded to the persistent storage 108 through the communications unit 110.

The I/O interface(s) 112 allows for input and output of data with other devices that may be connected to the computing device 100. For example, the I/O interface 112 may provide a connection to external device(s) 118 such as a keyboard, keypad, a touch screen, and/or some other suitable input device. The external device(s) 118 can also include portable computer readable storage media such as, for example, thumb drives, portable optical or magnetic disks, and memory cards. Software and data can be stored on such portable computer readable storage media and can be loaded onto the persistent storage 108 via the I/O interface(s) 112. The I/O interface(s) 112 also connect to a display 190. The display 190 provides a mechanism to display data to a user and may be, for example, a computer monitor.

Figure 2:
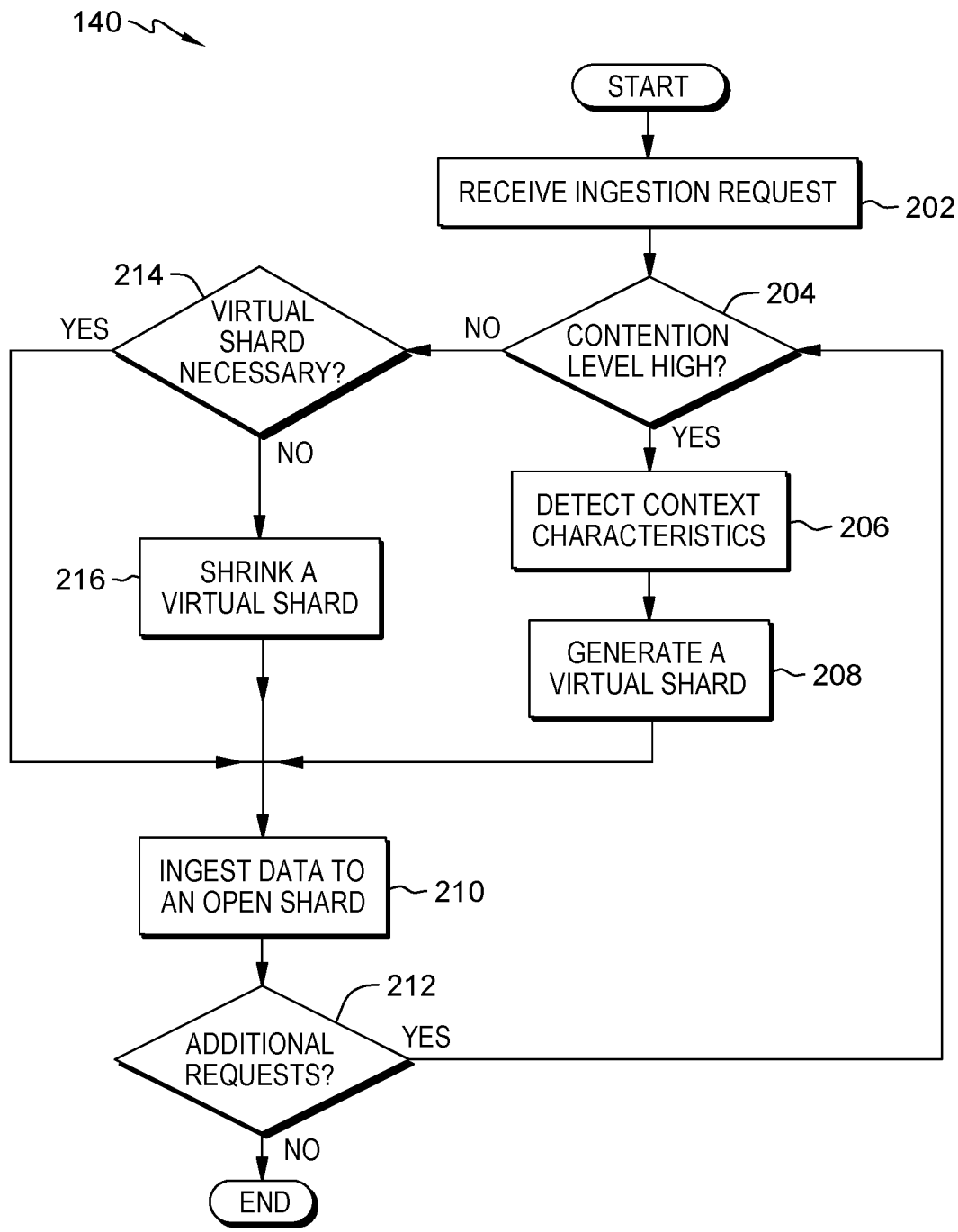
FIG. 2 is a flowchart depicting operational steps of a virtual shard manager on a computer within the data processing environment of FIG. 1.

FIG. 2 is a flowchart depicting operational steps of a virtual shard manager (e.g., the virtual shard manager 140 of FIG. 1) logic, executing within the computing environment 10 of FIG. 1, in accordance with an embodiment of the present invention. The virtual shard manager 140 receives a request to ingest data to the data set (e.g., the data set 130 of FIG. 1), and in particular to one or more of the shards (e.g., shards 132) of the data set (block 202). The virtual shard manager tracks the shards and monitors when certain of the shards are a "hotspot shard" or in other words have a contention level that is high. A high contention level means that requests to access or write data to that particular shard are prevalent enough to diminish performance of the CPU. The characteristics that define a high level of contention may be different for different systems (e.g., the device 100 of FIG. 1), so the virtual shard manager 140 is programmed to detect when the ingestion request is directed to a hotspot shard for the particular database (block 204). For example, the virtual shard manager 140 may track the number of ingestion and query requests for a given time period, and track a threshold above which the shard is considered a hotspot shard. Additionally or alternatively, the shard may outgrow other shards such that ingestion requests become unbalanced between the physical shards.

If the virtual shard manager 140 detects that the ingestion request is directed to a hotspot shard (block 204, Y), then the virtual shard manager detects context characteristics within the documents of the data (block 206). That is, the virtual shard manager 140 reads one or more fields that are not the shard key to determine a context for further dividing the data of the ingestion request. The virtual shard manager then generates a virtual shard based on the context (block 208). The virtual shard is generated from a virtual shard key that divides the data, the motivation being virtual shards that even out the ingestion requests. The virtual shard key may include a context characteristic that is different than the primary context characteristic of the physical shards. The virtual shards may be accessed and have data ingested in the same way as a physical shard, thus expanding the avenues of data ingestion and relieving bottlenecks. The virtual shard virtually duplicates at least a portion of the hotspot shard, meaning that any data within the virtual shard has the same value for the shard key as the data within the physical shard.

The virtual shard manager 140 ingests the data to an open shard (block 210). An "open shard," as used herein, means a shard that does not have a high contention level. The open shard may be the shard that the virtual shard manager just generated, or in certain embodiments the open shard may be a previously generated virtual shard. In these circumstances the just-generated shard is anticipatory and may be used to ingest other documents of the data set. Furthermore, in certain embodiments the open shard may be the physical shard.

The virtual shard manager 140 continues to monitor the contention level of the physical shards and the virtual shards and receives additional requests for data ingestion (block 212). If there is an additional request, the virtual shard manager 140 reviews whether the request is directed to a shard (physical or virtual) with a high contention level. For the cases in which the contention level is not high (block 204, No), the virtual shard manager 140 looks for whether there is a virtual shard that is no longer necessary. That is, virtual shard manager 140 determines that if a contention level is not high but the virtual shard is still busy enough or contains a large amount of data, then the virtual shard is still necessary (block 214, Yes) and the virtual shard manager 140 ingests the data into the open shard. In the case that the virtual shard is not necessary (e.g., the virtual shard is not under contention and/or the data of the virtual shard may be written elsewhere) (block 214, No) then responsive to detecting the low contention level for the virtual shard the virtual shard manager 140 shrinks the virtual shard (block 216). The virtual shard shrinks by moving and/or deleting data that is not longer needed, and in some cases the virtual shard manager 140 removes the virtual shard from the data set 130 entirely. The virtual shard manager 140 then ingests the data to an open shard (block 210). When the virtual shard manager 140 does not have any further ingestion requests, the method ends.

Figure 3:
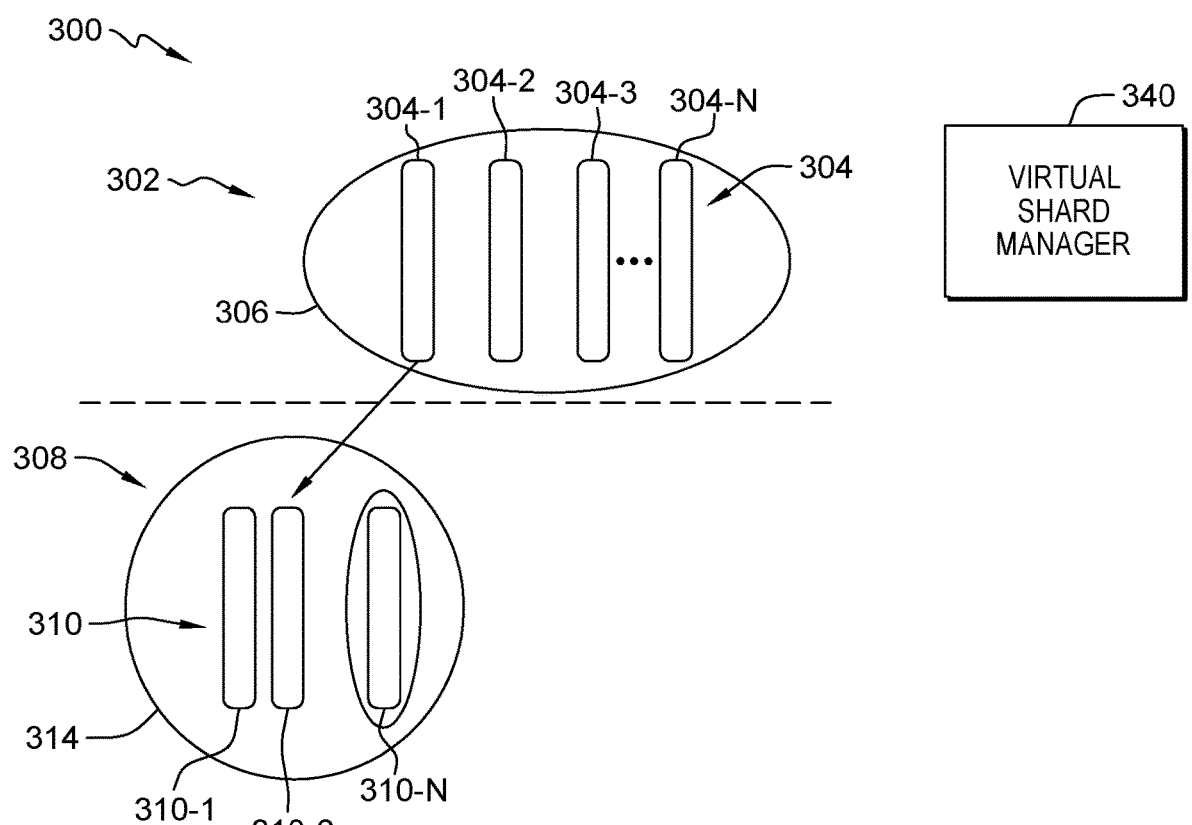
FIGS. 3-6 are schematic representations of a multi-tier shard tree being managed by a virtual shard manager, in accordance with an illustrative embodiment of the present invention.

FIG. 3 is a schematic representation of a multi-tier shard tree 300 of a database being managed by a virtual shard manager 340, in accordance with an illustrative embodiment of the present invention. A first tier 302 of the shard tree 300 includes physical shards 304 which are sharded using a first shard key 306. In embodiments of the present invention, there may be any number of physical shards 304, as indicated by the annotation 304-1 through 304-N. In general, two or more physical shards 304 may exist within the first tier 302. As used herein, shard 304 refers to any single physical shard of shards 304-1 through 304-N. As described above, the shards 304 may be located remotely from each other, but a device (e.g., the device 100 of FIG. 1) selectively ingests documents into the shards 304 based on the value of the shard key 306. That is, all the data in a first shard 304-1 has a shard key value that is in the defined range for the first shard 304-1, and the data in the second shard 304-2 has a shard key value that is in a defined range for the second shard 304-2 that is different from the shard key value of the first shard 304-1. As a shard 304 grows (i.e., through data ingestion) it may split to enable faster data ingestion and query. The illustrated embodiment shows the first shard 304-1 in a state that cannot be split by further division of the shard key 306, and the virtual shard manager 340 has generated virtual shards 310 in a first virtual tier 308 below the first shard 304-1.

The first virtual tier 308 of the shard tree 300 includes virtual shards 310 which are generated using a first virtual shard key 314. The first virtual tier 308 may include any number of virtual shards 310, as indicated by the annotation 310-1 through 310-N. As used herein, shard 310 refers to any single virtual shard of shards 310-1 through 310-N. Each shard 304 may have multiple virtual shards 310. In the illustrated embodiment of FIG. 3, the first virtual tier 308 includes virtual shard 310 generated only from the first physical shard 304-1. The virtual shard manager 340 monitors the physical shards 304 and the virtual shard 310 for hotspot shards, and generates additional virtual shards 310 when one of the existent shards 304, 310 reaches a high contention level.

To select the virtual shard key 314, the virtual shard manager 340 detects context characteristics in the data that is being ingested, as explained above. The context characteristics are each a potential virtual shard key, so the virtual shard manager 340 tracks these potential virtual shard keys for the data that would be ingested to the virtual shards that would be generated from the potential virtual shard keys, and the potential contention thereof. The virtual shard manager 340 then evaluates the distribution of the hotspot data for each of the potential virtual shard keys and may then select the first virtual shard key 314 based on this distribution of the hotspot data.

The virtual shard manager 340 also maintains an index of the virtual shards 310 so that queries regarding the data within the virtual shards 310 may be rendered together with the data of the physical shard. Furthermore, multiple parallel indexes of the virtual shards 310 may be maintained concurrently to reduce the total amount of time it takes to get an order number change through the database. Parallel index maintenance trades resources for time, increasing the input and output velocity of a given application or transaction.

Figure 4:
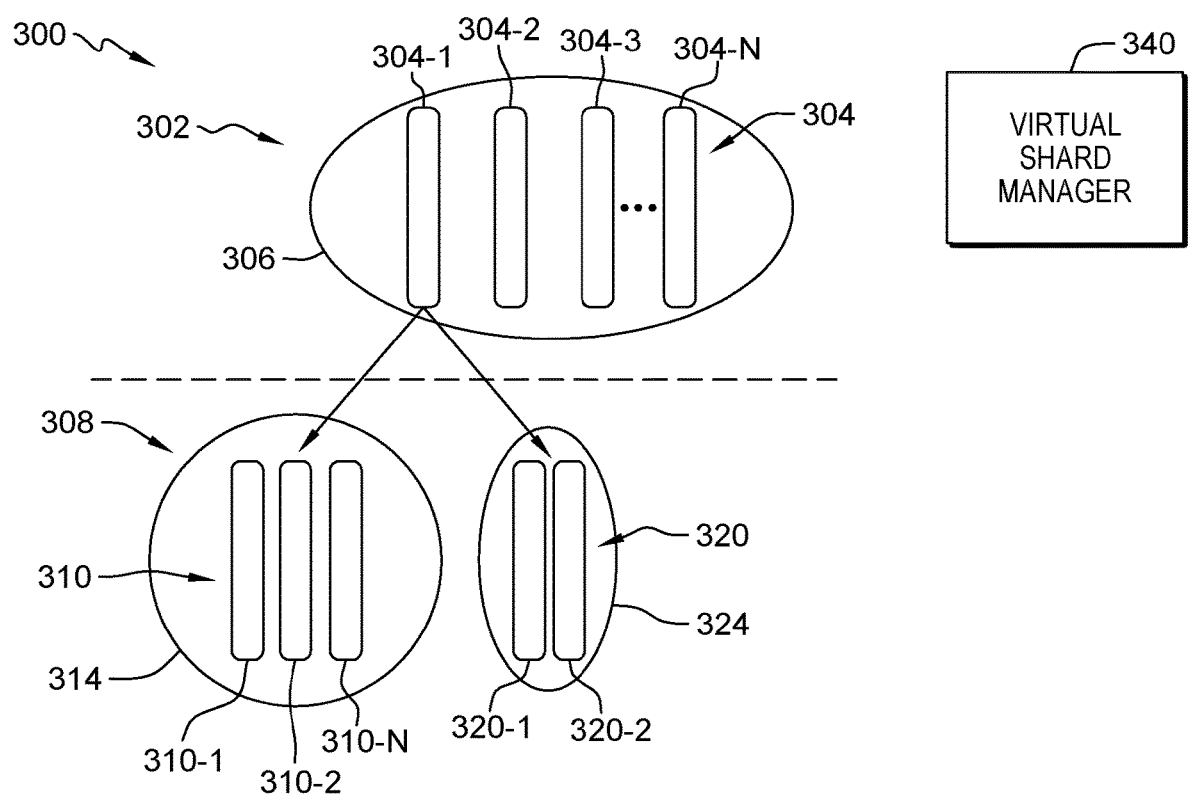

FIG. 4 is a schematic representation of the multi-tier shard tree 300 of FIG. 3. The shard tree 300 includes the first tier 302, with the physical shards 304, and the second tier 308 with the primary virtual shards 310. In the illustrated embodiment of FIG. 4, however, the second tier 308 includes secondary virtual shards 320 generated with a second virtual shard key 324. The second virtual shard key 324 is different from the first shard key 306 and the first virtual shard key 314. In a purely inclusive example: if the data set ingested in the shard tree 300 includes data about a population of people, the first shard key 306 could be 'age', with the first shard 304-1 including a specific range of ages (e.g., 30-35 years old). If the age range for the first shard 304-1 cannot be split and is a hotspot shard (with a high contention level), the virtual shard manager 340 generates virtual shards 310 based on the virtual shard key 314 of 'occupation'. Furthermore, the virtual shard manager 340 may generate secondary virtual shards 320 based on the virtual shard key 324 of 'gender' (i.e., virtual shard 320-1: female; virtual shard 320-2: male).

Figure 5:
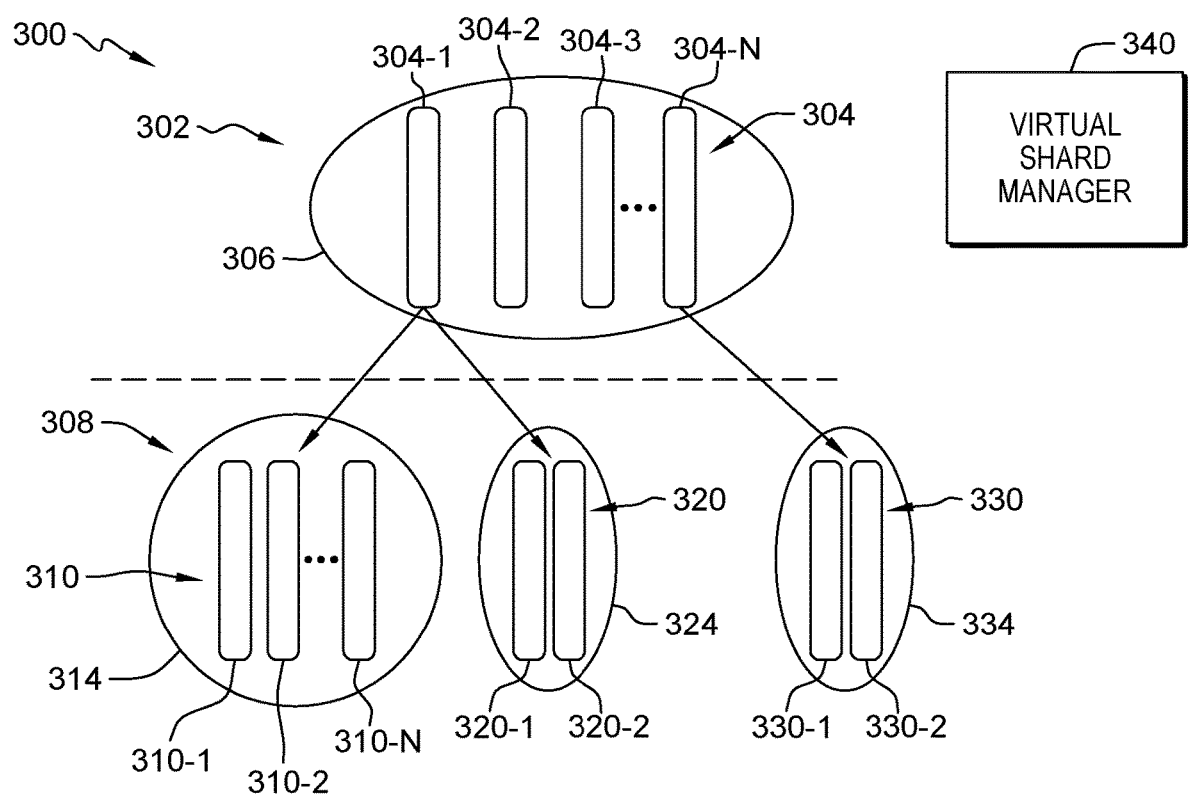

FIG. 5 is a schematic representation of the multi-tier shard tree 300 of FIG. 3. The shard tree 300 includes the first tier 302, with the physical shards 304, and the second tier 308 with the primary virtual shards 310 and the secondary virtual shards 320. In the illustrated embodiment of FIG. 5, however, the second tier 308 includes tertiary virtual shards 330 generated with a third virtual shard key 334. The tertiary virtual shards 330 are different from the primary virtual shards 310 and the secondary virtual shards 320 with respect to the physical shard 304 of origin. The tertiary virtual shards 330 are generated not from the first physical shard 304-1, but from the nth physical shard 304-N. The third virtual shard key 334 may be the same field as the first virtual shard key 314 or may be different. Since the physical shard 304-N is different from the physical shard 304-1 for the first virtual shard key 314, then the data ingested in the tertiary virtual shards 330 is different.

Figure 6:
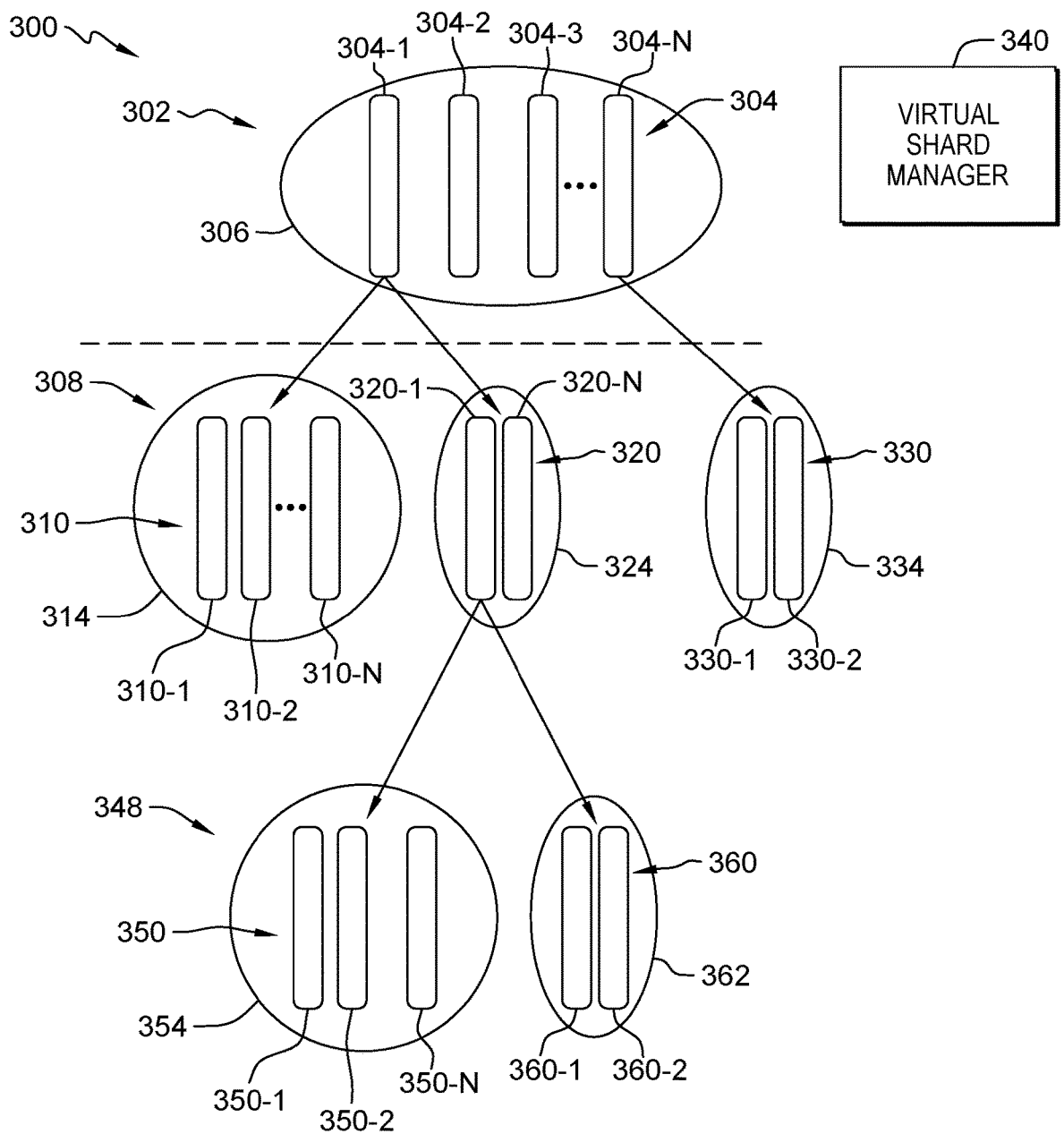

FIG. 6 is a schematic representation of the multi-tier shard tree 300 of FIG. 3 illustrated at a later time. The shard tree 300 includes the first tier 302, with the physical shards 304, and the second tier 308 with some virtual shards 310, 320, 330. In the illustrated embodiment of FIG. 6, however, the shard tree 300 has grown to include a third tier 348 with virtual shards 350, 360 generated from a virtual shard 320-1. Quaternary virtual shards 350 are generated using a fourth virtual shard key 354, which, as stated for the third virtual shard key 334, may be the same as any shard key but the second shard key 324, or may be different from all shard keys in the shard tree 300. Quintenary virtual shards 360 are generated using a fifth virtual shard key 364.

Additionally, the shard tree 300 at the time in FIG. 6 only has one primary virtual shard 310. As stated above with respect to FIG. 2, the virtual shard manager 340 shrinks virtual shards (e.g., any of 304, 310, 320, 330, 350, 360) that are no longer hotspot shards. Between FIG. 5 and FIG. 6, the virtual shard manager 340 monitored the primary virtual shards 310 and shrank all but the first primary virtual shard 310-1.

The virtual shard manager 340 thus greatly increases the ability of the environment 10 to ingest and query data in a data set 130. The shard tree 300 expands hotspot shards so that the single read/write location of one physical shard becomes many locations to ingest or query data.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving an ingestion request to ingest data to a database comprising physical shards;
   detecting that the ingestion request is directed to a first hotspot shard comprising a shard key, wherein the first hotspot shard comprises a contention level over a threshold value;
   detecting context characteristics from fields within the data other than the shard key;
   generating a first virtual shard based on a first virtual shard key selected from the detected context characteristics, wherein the first virtual shard virtually stores a portion of the first hotspot shard; and
   ingesting the data to the first virtual shard.

2. The method of claim 1, wherein the first virtual shard key is generated from a context characteristic that is different from a primary context characteristic of the physical shards.

3. The method of claim 1, wherein generating the first virtual shard comprises:
 tracking the context characteristics for potential virtual shard keys;
 evaluating a distribution of hotspot data for the potential virtual shard keys; and selecting the first virtual shard key based on the distribution of the hotspot data.

4. The method of claim 1, comprising:
 receiving a second ingestion request to ingest data to the database;
 detecting that the second ingestion request is directed to a second hotspot shard;
 generating a second virtual shard based on a second virtual shard key; and
 ingesting the data of the second ingestion request to the second virtual shard.

5. The method of claim 1, comprising:
 receiving a second ingestion request to ingest data to the database;
 detecting that the second ingestion request is directed to the first hotspot shard;
 generating a second virtual shard based on the first virtual shard key; and
 ingesting the data to the second virtual shard.

6. The method of claim 5, comprising:
 monitoring a contention level for the second virtual shard;
 detecting a low contention level for the second virtual shard;
 responsive to detecting the low contention level for the second virtual shard, determining that the second virtual shard is not necessary; and
 shrinking the second virtual shard.

7. The method of claim 1, comprising:
 receiving a second ingestion request to ingest data to the database;
 detecting that the second ingestion request is directed to the first hotspot shard;
 generating a second virtual shard based on a second virtual shard key; and
 ingesting the data to the second virtual shard.

8. The method of claim 7, comprising:
 receiving a third ingestion request to ingest data to the database;
 detecting that the third ingestion request is directed to the second virtual shard key;
 generating a third virtual shard based on a third virtual shard key, wherein the third virtual shard virtually duplicates at least a portion of the second virtual shard; and
 ingesting the data to the third virtual shard.

9. The method of claim 1, comprising maintaining parallel indexes of the physical shards and the first virtual shard.

10. A computer program product comprising:
 one or more computer readable storage media, and program instructions collectively stored on the one or more computer readable storage media, the program instructions comprising:
  program instructions to receive an ingestion request to ingest data to a database comprising physical shards;
  program instructions to detect that the ingestion request is directed to a first hotspot shard comprising a shard key, wherein the first hotspot shard comprises a contention level over a threshold value;
  program instructions to detect context characteristics from fields within the data other than the shard key;
  program instructions to generate a first virtual shard based on a first virtual shard key selected from the detected context characteristics, wherein the first virtual shard virtually stores a portion of the first hotspot shard; and
  program instructions to ingest the data to the first virtual shard.

11. The computer program product of claim 10, wherein the first virtual shard key is generated from a context characteristic that is different from a primary context characteristic of the physical shards.

12. The computer program product of claim 10, wherein the program instructions to generate the first virtual shard comprise:
 program instruction to track the context characteristics for potential virtual shard keys;
 program instructions to evaluate a distribution of hotspot data for the potential virtual shard keys; and
 program instructions to select the first virtual shard key based on the distribution of the hotspot data.

13. The computer program product of claim 10, wherein the program instructions further comprise:
 program instructions to receive a second ingestion request to ingest data to the database;
 program instructions to detect that the second ingestion request is directed to a second hotspot shard;
 program instructions to generate a second virtual shard based on a second virtual shard key; and
 program instructions to ingest the data of the second ingestion request to the second virtual shard.

14. The computer program product of claim 10, wherein the program instructions further comprise;
 program instructions to receive a second ingestion request to ingest data to the database;
 program instructions to detect that the second ingestion request is directed to the first hotspot shard;
 program instructions to generate a second virtual shard based on the first virtual shard key;
 program instructions to ingest the data to the second virtual shard;
 program instructions to monitor a contention level for the second virtual shard;
 program instructions to detect a low contention level for the second virtual shard;
 program instructions to responsive to detecting the low contention level for the second virtual shard, determine that the second virtual shard is not necessary; and
 program instructions to shrink the second virtual shard.

15. The computer program product of claim 10, wherein the program instructions further comprise:
 program instructions to receive a second ingestion request to ingest data to the database;
 program instructions to detect that the second ingestion request is directed to the first hotspot shard;
 program instructions to generate a second virtual shard based on a second virtual shard key;
 program instructions to ingest the data to the second virtual shard;
 program instructions to receive a third ingestion request to ingest data to the database;
 program instructions to detect that the third ingestion request is directed to the second virtual shard key;
 program instructions to generate a third virtual shard based on a third virtual shard key, wherein the third virtual shard virtually duplicates at least a portion of the second virtual shard; and
 program instructions to ingest the data to the third virtual shard.

16. The computer program product of claim 10, the program instructions comprising program instructions to maintain parallel indexes of the physical shards and the first virtual shard.

17. A computer system comprising:

one or more computer processors, one or more computer readable storage media, and program instructions collectively stored on the one or more computer readable storage media for execution by at least one of the one or more computer processors, the program instructions comprising:

program instructions to receive an ingestion request to ingest data to a database comprising physical shards;

program instructions to detect that the ingestion request is directed to a first hotspot shard comprising a shard key, wherein the first hotspot shard comprises a contention level over a threshold value;

program instructions to detect context characteristics from fields within the data other than the shard key;

program instructions to generate a first virtual shard based on a first virtual shard key selected from the detected context characteristics, wherein the first virtual shard virtually stores a portion of the first hotspot shard; and program instructions to ingest the data to the first virtual shard.

18. The computer system of claim 17, wherein the first virtual shard key is generated from a context characteristic that is different from a primary context characteristic of the physical shards.

19. The computer system of claim 17, wherein the program instructions to generate the first virtual shard comprise:

program instructions to track the context characteristics for potential virtual shard keys; and program instructions to evaluate a distribution of hotspot data for the potential virtual shard keys; and selecting the first virtual shard key based on the distribution of the hotspot data.

20. The computer system of claim 17, wherein the program instructions further comprise program instructions to maintain parallel indexes of the physical shards and the first virtual shard.

* * * * *